June 29, 1937. F. WAGNER 2,085,487
BALANCED STEAM INLET VALVE
Filed Dec. 18, 1934 2 Sheets-Sheet 1

Inventor:
Fritz Wagner

June 29, 1937.   F. WAGNER   2,085,487
BALANCED STEAM INLET VALVE
Filed Dec. 18, 1934    2 Sheets-Sheet 2

Inventor:
Fritz Wagner
By
Attorney

Patented June 29, 1937

2,085,487

UNITED STATES PATENT OFFICE 2,085,487

BALANCED STEAM INLET VALVE

Fritz Wagner, Berlin-Lichterfelde, Germany

Application December 18, 1934, Serial No. 758,120
In Germany January 27, 1934

5 Claims. (Cl. 277—36)

The invention relates to a balanced steam inlet valve of the type described in my prior U. S. Patent 1,833,062, of November 24, 1931 with a principal and an auxiliary valve and an equalizing chamber which chamber is connected to the live-steam space in front of the principal valve through pipes with downwardly extending openings mounted in the body of the principal valve. Such valves have the drawback that chattering of the principal valve may occur. In order to avoid such chattering, each one of the pipes in the body of the principal valves is, according to the invention, equipped with a bore in the axis of its opening which opening is adapted to be closed by a throttling disk, and a guard ring is provided which surrounds the outlet opening of the auxiliary valve at the base of the principal valve.

Figure 1:
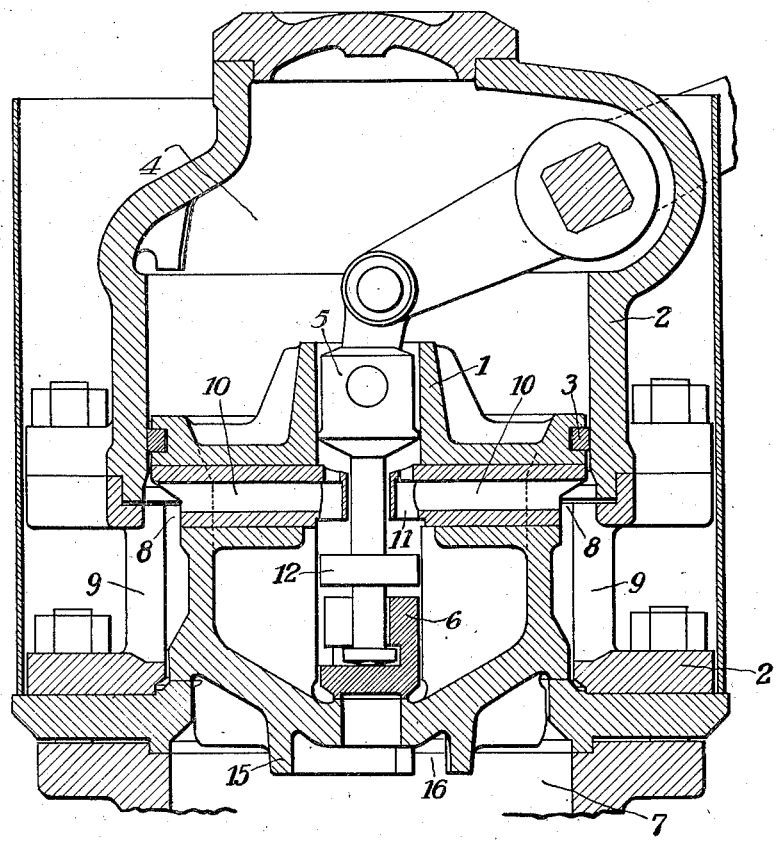
Figure 2:
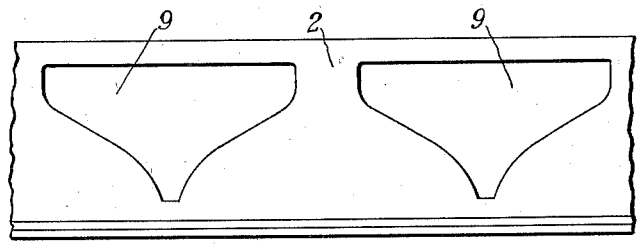
Figure 5:
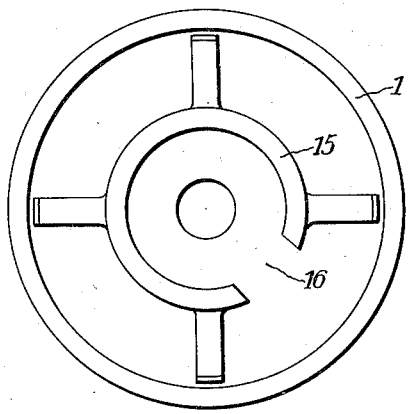
Figure 3:
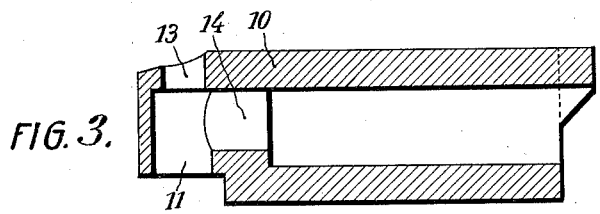
Figure 4:
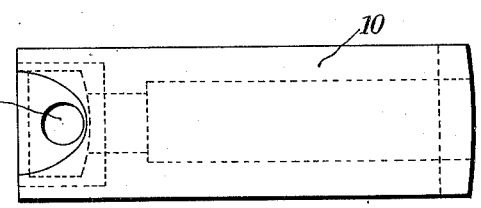

The subject matter of the invention will be described below by way of example with reference to the accompanying drawings in which Fig. 1 is an axial section of my novel valve, Fig. 2 shows a portion of its casing, Fig. 3 is an axial section, and Fig. 4 is a plan view, of one of the connecting or supply pipes referred to, with a downwardly extending opening, and Fig. 5 is a plan view of the principal valve, viewed from below.

Referring now to the drawings, and first to Fig. 1, the principal valve 1 which at its upper end is equipped with a differential piston, forms, with the upper portion of casing 2, an equalizing chamber 4 sealed by the piston-packing ring 3. The equalizing chamber 4 is closed against the inlet pipe 7 by the auxiliary valve 6 connected to the spindle 5. Below the differential piston, an annular space 8 is provided between the principal valve and the casing, and is connected to the live-steam space by openings 9, and to the equalizing chamber 4 by pipes 10. The openings 9, as shown in Fig. 2, are gradually restricted from their upper edges and open below into the narrow annular space between the casing and the principal valve. The two pipes 10 have downwardly inclined openings 11 in the equalizing chamber and both openings 11 are arranged in the same horizontal plane. Extending in parallel to such openings and at a suitable distance therefrom, a throttling disk 12 is seated on the spindle 5 for closing the openings 11 against the equalizing chamber 4 when the spindle 5 is raised.

Each pipe 10, as best seen in Figs. 3 and 4, has an upwardly directed hole or bore 13 above its opening 11, and a restricted passage 14 ahead of the opening 11 and the hole or bore 13.

The operation of the valve will now be described as if its pipes 10 were without the hole or bore 13.

The live steam acting on the upper and lower faces of the differential piston generates an upwardly directed lifting force and a downwardly directed closing force which is much in excess of the lifting force and holds the principal valve in the closing position.

The lifting force is constant but the closing force is variable and becomes less than the lifting force when the auxiliary valve is opened and steam flows into the inlet pipe 7 while the flow of live steam to the equalizing chamber 4 is interrupted by the throttling disk 12 closing both openings 11. The excessive lifting force generated by these means opens the principal valve and would move it on at the velocity of the spindle but is immediately intensified by the excess of lifting force generated by the higher pressure of the live steam which immediately flows into the inlet pipe 7 through the gap below the seat of the principal valve. This fresh excess of lifting force ceases after the principal valve has performed a very short stroke as then the free sectional area of the gap through which the steam flows to the inlet pipe, which area increases with the widening of the gap in proportion to stroke, becomes larger and remains larger than the area of the supply opening in front of the principal valve, and so the outflowing live steam in the gap is no longer at a higher pressure than the pressure in the equalizing chamber 4. The principal valve, however, is accelerated beyond the velocity of the spindle by the short jerk of power due to the intensification of the lifting force. The acceleration of the principal valve moves the two openings 11 away from the throttling disk 12 and the flow of live steam into the equalizing chamber which now begins again, intensifies the closing force which now exerts a decelerating action on the movement of the principal valve. The deceleration immediately reduces the distance between the two openings 11 and the throttling disk which continues its upward movement. The flow of live steam to the equalizing chamber, however, is immediately throttled until, by the reduction of the closing force due to such throttling, the lifting force preponderates and now moves the principal valve permanently in the same direction as the spindle, and at the same velocity as the spindle, until the principal valve has returned into its initial position.

As during this equalization of velocities which occurs in a very short time, the principal valve and the spindle always move in the same direction, the principal valve will not chatter under normal conditions. However, it starts chattering immediately if forces occur during the opening stroke which move the principal valve in a direction opposite to the movement of the spindle. Such forces frequently occur in operation. They may be due to poor finishing of the sealing face of the principal valve, or to a surge in the steam demand of the engine, or to collision, below the opening of the auxiliary valve, of the flows of steam from openings 9 into the inlet pipe below the principal valve after the valve has been opened. Such collision prevents flow of steam from chamber 4.

It is the object of the invention to eliminate the action of such interfering forces on the principal valve by providing the holes or bores 13 in the pipes 10.

The operation of opening the valve occurs in the manner described only if the principal valve is moved upwards from its closing position only by the excess forces generated at the differential piston. This, however, occurs only if the principal valve makes a tight fit on the seating face in the casing with the outer perimeter of its sealing face. If the seat is poorly finished and sealing begins at a point intermediate the inner and outer perimeters only, live steam penetrates below the non-sealing portion of the principal valve and exerts an additional lifting force. When the auxiliary valve is opened, excess of pressure occurs not only at the differential piston but at the same time also at the valve seat, and both forces open the principal valve by cooperation already before the throttling disk has been able to reduce the closing force by interrupting the flow of live steam to the equalizing chamber. The closing force therefore overcomes the lifting force at the differential piston as soon as the lifting force at the valve seat ceases after a short movement of the principal valve. The principal valve is immediately forced back towards its closing position by the excess of closing force. If the return movement occurs already at the moment the auxiliary valve has just laid open the outflow opening into the steam inlet pipe, the principal valve strikes its seat in the casing and thereby immediately generates the force at the valve seat which reopens the principal valve, and so on. The principal valve keeps chattering on its seat if the spindle is arrested at this moment. If the spindle is moved on, or the retrograde movement of the principal valve occurs only at a larger stroke of the spindle, the principal valve is intercepted by the two openings 11 striking the throttle disk 12. While now the closing force is reduced immediately by the interruption of the flow of live steam to the equalizing chamber, the pressure in the two pipes 10 at the same time rises to boiler pressure and, at the projected faces of the two openings, generates a comparatively strong lifting force whose excess in cooperation with the positive (or, perhaps, still negative) excess at the differential piston immediately returns the principal valve into open position. Immediately after the beginning of this movement, this lifting force is removed as the two openings move away from the throttling disk and, as in the meantime the closing force has been increased by the flow of live steam into the equalizing chamber, the excess of the closing force beyond the lifting force at the differential piston throws back the principal valve to the throttling disk. The principal valve now chatters on the throttling disk, damaging the disk and the two openings, with gradually decreasing energy and almost until the pressures in the inlet pipe and the boiler have become equal.

According to the invention, the chattering movements of the principal valve are damped rapidly until they cease, by the reduction of the lifting force which occurs in the live-steam supply pipes 10 by the principal valve, upon its retrograde movement, striking the throttling disk 12. This is effected by providing the hole or bore 13 above the opening 11 in each pipe 10, as described.

The area of the two bores 13 obviously must never be so large that the residual pressure which is present in the equalizing chamber 4 after the two openings 11 have been closed by the throttling disk 12, prevents lifting of the principal valve which is relieved by the excess of lift and seats tightly on the outer perimeter of its seat, by means of the spindle without effort. Nor must the area of the bores be so large as to prevent sufficiently intense reduction of the pressure in the equalizing chamber as soon as the flow of live steam to the equalizing chamber 4 has been interrupted by the closure of the two openings 11 by the throttling disk 12.

When the inertia of the upwardly moving principal valve has been consumed by the closing force which increases with the stroke, and the closing force then throws the principal valve back onto the throttling disk, the additional lifting force which occurs upon the collision of openings 11 and throttling disk 12, is only equal to the difference of the free sectional areas of openings 11 and bores 13. This additional lifting force, however, can be so determined by suitably dimensioning the free sectional areas 14, 13, and 11, that the velocities of the principal valve and the spindle are equalized almost immediately.

It may occur, and particularly if the valve is mounted on a locomotive, and the wheels of the locomotive slip, that during the opening stroke the steam flows into the inlet pipe below the principal valve at so high a velocity that the flows of steam collide in the axis of the valve and interfere with the flow of the steam from the equalizing chamber. This causes the abrupt buildings-up, during the movement of lifting the valve, of so high an excess pressure in the equalizing chamber, that the principal valve is hurled down with very great force, and chatters.

According to the invention, a guard ring 15, as shown in Figs. 1 and 5, is arranged at the base of the principal valve 1 in concentric relation to the axis of the opening of the auxiliary valve. The guard ring deflects the flow of steam and prevents the discharge of the steam from the equalizing chamber without interference.

If solid, the guard ring may act as a suction nozzle on the equalizing chamber and reduce the residual pressure in the chamber to such an extent that the principal valve is moved upwards with great force. Such suction is prevented by providing a slot 16 in the guard ring which extends as far as the base of the principal valve, as illustrated in Fig. 5 showing the base of the principal valve, viewed from below.

I claim:

1. A balanced steam inlet valve, comprising a principal valve, an auxiliary valve, an equalizing chamber arranged adjacent the principal valve, a throttling disc arranged in the principal valve and adjacent the auxiliary valve, and a pipe in the principal valve having a downwardly-extending opening adapted to be closed by the disc and a hole in addition to the opening, said pipe communicating with the live steam space in front of the principal valve and the equalizing chamber.

2. A valve according to claim 1, in which the principal valve is provided with a guard ring with a slot therein arranged at the base of the principal valve and surrounding an opening of the auxiliary valve.

3. A balanced steam inlet valve, comprising a principal valve, an auxiliary valve mounted in said principal valve, a spindle for the auxiliary valve and having a throttling disc thereon, and a pipe in the principal valve extending to a point adjacent the spindle and having a downwardly-extending opening adapted to be closed by the disc and a hole in addition to the opening.

4. A valve according to claim 3, in which the principal valve is provided with a guard ring with a slot therein arranged at the base of the principal valve and surrounding an opening of the auxiliary valve.

5. A balanced steam inlet valve comprising a principal valve, an auxiliary valve mounted in said principal valve, a pair of pipes in the principal valve each provided on a horizontal axis and each having oppositely positioned upwardly and downwardly extending openings, and a spindle for the auxiliary valve having a throttling disk thereon adapted to close the downwardly extending openings of the pipes.

FRITZ WAGNER.